April 17, 1934.    W. D. EGLINTON    1,955,625
COLLAPSIBLE LEG OR POST
Filed June 17, 1932

William David Eglinton
Inventor
By Ogle R. Singleton
Attorney

Patented Apr. 17, 1934

1,955,625

UNITED STATES PATENT OFFICE 1,955,625

COLLAPSIBLE LEG OR POST

William David Eglinton, Croydon, England

Application June 17, 1932, Serial No. 617,906
In Great Britain June 22, 1931

6 Claims. (Cl. 287—99)

This invention relates to collapsible legs or posts and although particularly designed for use in connection with folding spectacles is capable of use in other connections where it is required to provide two or more elements adapted to be secured together and to end to form a substantially rigid leg or post in their extended condition and to be disconnected and arranged to lie side by side in their collapsed condition.

The invention consists broadly in providing the members to be joined with fitments permanently linked together and providing means whereby the abutting ends of the adjoining members can be locked rigidly together.

Figure 1:
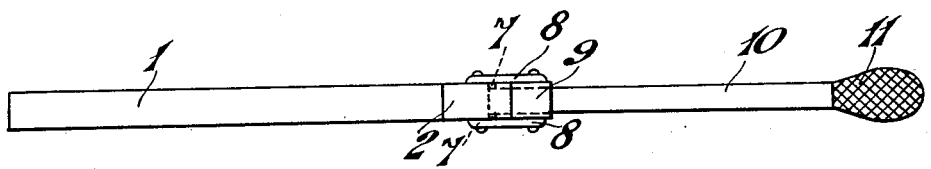
Figure 2:
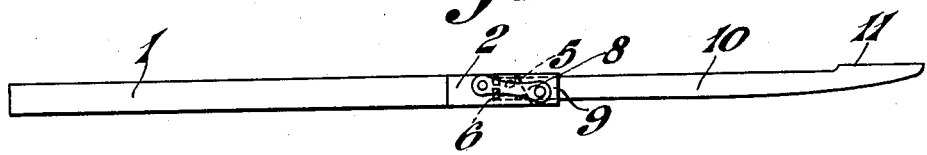
Figure 3:
Figure 4:
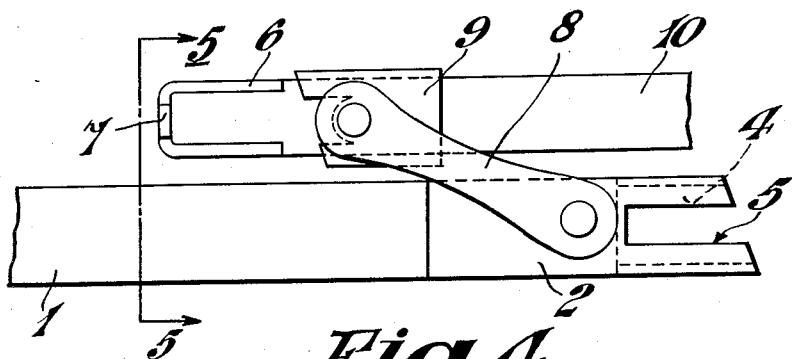
Figure 5:
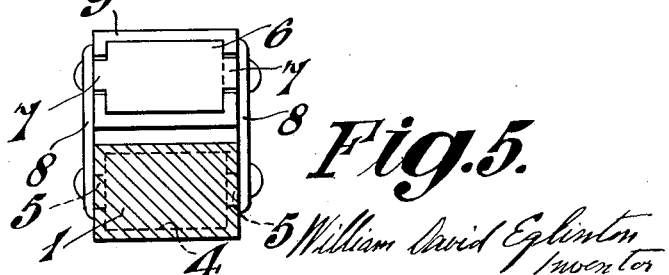

In the accompanying drawing I have illustrated the invention, Figure 1 being an elevational view of the structure in the operative position, Figure 2 is a plan view of Figure 1, Figure 3 is a similar view to Figure 1 showing the parts collapsed, Figure 4 is an enlarged view similar to Figure 3 showing the parts with their adjoining ends disconnected ready for collapsing or telescoping, and Figure 5 is a sectional view on the line 5—5 of Figure 4.

Referring to the drawing the end of one of the members 1 is provided with a fitment 2 having a recess or socket 4 the side walls of which are slotted as shown at 5. On the abutting end of the other member 10 I provide a spigot fitment 6 adapted to fit in the recess 4 aforesaid and having side lugs 7 which co-operate with the slots 5 aforesaid in its walls of the recess 4.

The recessed or socket fitment is connected by hinged side links 8 to a third fitment 9 which slides on the other member 10 of the two members of the leg or post as a whole this sliding fitment 9 having recesses in its side walls into which the side lugs 7 on the end of the member 10 engage and these recesses, when the leg or post is in extended or operative condition form continuations of the slots in the side walls of the fitment on the other member before referred to.

In operation, when it is desired to connect the two leg members 1 and 10 together to form a single rigid leg or post the two members are arranged in alignment, the pivoted links permitting this and in order to facilitate the aligning of the two members the ends of the abutting fitments may be inclined as shown. After the two leg members have been aligned the member 10 having the spigot fitment with the side lugs 7 is pushed or telescoped into the recessed socket fitment on the end of the other member 1 and the lugs 7 ride into the slots 5 aforesaid in the side walls of the recessed socket fitment and the two leg members are thus securely locked together. When it is desired to collapse the leg the two members are pulled apart and swung on the links aforesaid out of alignment and the one member is telescoped through the sliding fitment 9 so that the two leg members lie side by side as shown in Figure 3. In order to prevent complete disconnection of the two members the free end of the member 10 carrying the sliding fitment 9 is enlarged as shown at 11 so that it cannot pass through this sliding fitment.

It will be seen that an arrangement according to my invention while particularly useful for the legs of folding spectacles, will also be useful for other purposes such, for example, as the legs of a collapsible tripod.

What I claim and desire to secure by Letters Patent is:—

1. A collapsible leg comprising a post, a socket on the end of said post, a second post, a spigot on the end of said second post, a fitment carried by said second post through which said second post is slidable and pivoted links connecting hingedly said fitment to said socket.

2. A collapsible leg comprising a post, a socket on the end of said post, guide slots in the wall of said socket, a second post, a spigot on the end of said second post, guide lugs projecting laterally from said spigot and adapted to engage the guide slots of said socket, a fitment carried by said second post through which said second post can slide and a swinging link connection between said fitment and said socket.

3. A collapsible leg comprising a post, a socket on the end of said post, having its end inclined, and a second post, a spigot on the end of said second post, a fitment having its end inclined correspondingly with the inclined end of said socket carried by said second post through which said second post is slidable and pivoted links connecting hingedly said fitment to said socket.

4. A collapsible leg comprising two members permanently linked together so as to be capable of movement into and out of alignment one with the other, one of said members being provided with a socket end, and the other being provided with a spigot end adapted to fit into the socket end, the member having the spigot end being provided with a sliding fitment coupled to the other member by links so that when the two members have been separated and moved out of alignment, the member with the spigot end can be slid through the sliding fitment into the collapsed position.

5. In a collapsible leg, the combination of one leg member having a socket end; a collar; links pivoted to said leg member and said collar; and a second leg member, slidable in said collar, and having a spigot end adapted to co-act with said socket end to lock said leg members in aligned position.

6. In a collapsible leg, the combination of one leg member having a socket end provided with slots; a collar provided with slots; links pivoted to said leg member and said collar; and a second leg member slidable in said collar and having a spigot end provided with lugs received in said collar slots, and adapted to be received in the slots of the said socket end.

WILLIAM DAVID EGLINTON.